United States Patent [19]
Phelps et al.

[11] Patent Number: 5,501,219
[45] Date of Patent: Mar. 26, 1996

[54] REAL-TIME DYNAMIC TIME-OF-FLIGHT CALCULATOR

[75] Inventors: Robert N. Phelps, Livermore, Calif.; Lin X. Yao, Bellevue, Wash.

[73] Assignee: Siemens Medical Systems, Inc., Iselin, N.J.

[21] Appl. No.: 340,081

[22] Filed: Nov. 14, 1994

Related U.S. Application Data

[63] Continuation of Ser. No. 130,042, Sep. 30, 1993, abandoned.

[51] Int. Cl.$^6$ ................................................ A61B 8/00
[52] U.S. Cl. ........................................ 128/660.07; 128/916
[58] Field of Search ...................... 128/660.06, 660.07, 128/661.01, 916

[56] References Cited

U.S. PATENT DOCUMENTS

| | | | |
|---|---|---|---|
| 4,267,584 | 5/1981 | McKeighen et al. | 128/661.01 X |
| 4,387,597 | 6/1983 | Brondestini | 128/661.01 X |
| 4,471,785 | 9/1984 | Wilson et al. | 128/661.01 |
| 4,787,392 | 11/1988 | Saugeon | 128/661.01 |
| 5,148,810 | 9/1992 | Maslak et al. | 128/661.01 |
| 5,186,175 | 2/1993 | Hirama et al. | 128/661.01 |
| 5,230,340 | 7/1993 | Rhyme | 128/661.01 |
| 5,235,982 | 8/1993 | O'Donnell | 128/660.07 |

*Primary Examiner*—Francis Jaworski

[57] ABSTRACT

Time-of-flight calculations may be simplified by performing them on the fly at selected intervals and then interpolating the results to obtain a comprehensive set of values. The method and apparatus offer improved accuracy, speed, and hardware savings.

14 Claims, 4 Drawing Sheets

REAL-TIME DYNAMIC TIME-OF-FLIGHT CALCULATOR

This is a continuation of application Ser. No. 08/130,042, filed on 30 Sep. 1993 now abandoned.

FIELD OF THE INVENTION

This invention generally relates to ultrasound imaging equipment. Specifically, the invention is directed to the calculation of the time-of-flight of an ultrasound beam.

BACKGROUND OF THE INVENTION

In an ultrasound machine, a receive beamformer serves two functions: it focuses the receive beam and forms the beam. To focus the beam at any given point in space, the signal received by each element of an ultrasound probe or transducer must be properly combined with the signals from the other elements. This can be achieved by variably delaying the signals from each of the various elements so that the reflections from any given point are correctly summed. Additionally, the delay must be provided on a real-time basis.

Typically, delay (or time-of-flight) values are precalculated and then stored, but this requires significant amounts of memory and an accompanying time requirement for loading this memory. To economize, a subset is stored and the actual values are derived from the stored quantities, but this yields only an approximation. Moreover, the values are fixed with respect to the beam's origin and direction and must be recalculated if the user desires a different set of beam parameters.

Because these numbers are needed at such a rapid pace during an ultrasound examination, the calculations cannot be performed in software as this would be too slow. Thus, if the time-of-flight values are not precalculated and stored in memory, and a high degree of accuracy is desired, some other means must be provided.

SUMMARY OF THE INVENTION

These and other objects are achieved by a real-time dynamic time-of-flight calculator that performs calculations in N parallel paths. The physical locations of the elements of the probe are stored in memory. Then, using these locations coupled with the point of origin of the beam and the beam direction, the time-of-flight or delay times are calculated on the fly. Actual calculations are performed every m clock cycles and then interpolated to provide intermediate points.

The benefit of performing time-of-flight calculations in this manner is a significant savings in memory for storage of time-of-flight values. Only the element locations for the probe need be stored; the beam origin and direction are provided during the scanning process and the time-of-flight values are calculated at that time. If the probe is changed, only the element locations need be changed. Also, this arrangement allows for dynamic focusing, changing the depth while keeping all other parameters constant, yielding time-of-flight values for varying depths.

In actual use, the time-of-flight values are programmed for each beam line. To form each beam line, an acoustic pulse is fired. Then, reception is started, signals are received, and the time-of-flight values are updated dynamically.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
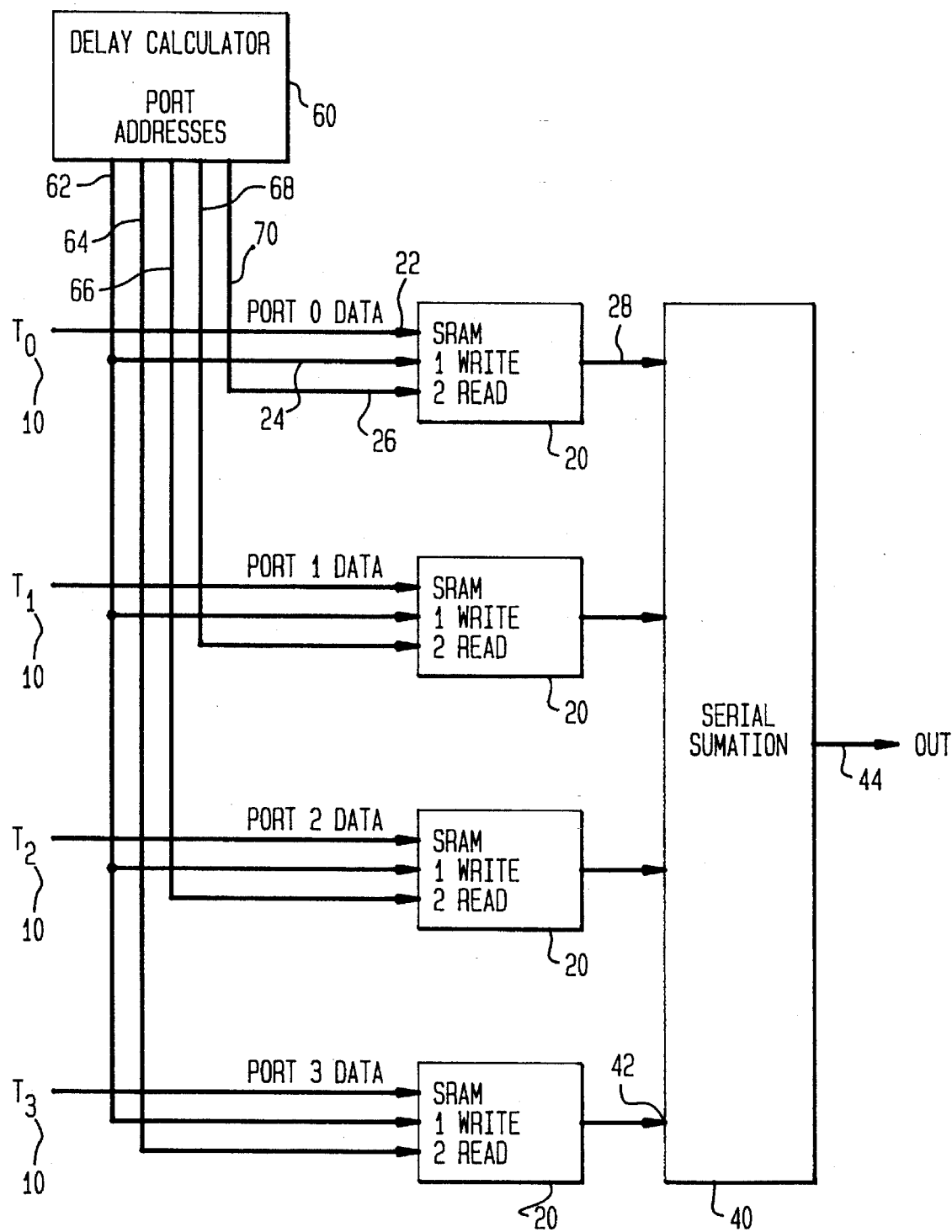
FIG. 1 is a partial schematic block diagram of a receive beamformer.

A partial schematic block diagram of an ultrasound machine beamformer is shown in FIG. 1. The diagram shows four transducer inputs $T_0$, $T_1$, $T_2$, and $T_3$ 10 that would be connected to an ultrasound transducer or probe (not shown), each input coming from a transducer element capable of receiving ultrasound energy or echoes and converting it to an electrical value. The circuit could have anywhere from 2 to n memories representing 2-to-n channels or parallel paths 12. In practice, a four-channel circuit would be combined with enough similar circuits to accommodate the total number of channels, be it 64, 128, 256, or some other number. Since the circuit here is shown with four channels 12, the remainder of this discussion will similarly assume four channels but it should be understood that the actual number of channels employed is a matter of design choice.

Each of the transducer inputs 10 is connected to a RAM 20 at its data input 22. The RAM also has a write address input 24, a read address input 26, and a data output 28.

The outputs 28 of the RAMs 20 are connected to a serial summation stage 40 at its inputs 42. The serial summation stage 40 provides a summation of the outputs of the four RAMs 20 at a serial summation stage output 44.

The addresses for the write and read functions of the RAMs 20 are provided by a time-of-flight or delay calculator 60, which actually computes addresses correlative to the time-of-flight. The calculator 60 has five outputs: a write address output 62, and four read address ports 0–3 (64, 66, 68, and 70). The addresses on the write address output 62 places the incoming data from the transducer in sequential locations in the RAMs 20.

The four read address values are used to read out the data once it has been stored. In receiving a return from an object under examination, e.g. focal point, the energy will arrive at the various elements of the transducer at different times. To reconstruct the return from a single point, the readout of the continuous data must be time delayed over the span of the transducer so that the signals on the transducer inputs 10 can be intelligently combined.

The time-of-flight calculation is based on the following relationship:

$$t_{time\,of\,flight} = \frac{\sqrt{(dy+k\Delta R\sin\theta)^2+(dx+k\Delta R\cos\theta)^2+z^2}+R_0}{c}$$

where:

dy is the distance between the element and the beam origin in the y-direction;

dx is the distance between the element and the beam origin in the x-direction;

z is the coordinate of the element in the z-direction;

k is the range cell count;

$\Delta R$ is the size of the range cell;

$\Theta$ is angle of the beam with respect to the x-axis (probe normal);

c is the speed of sound; and $R_0$ is the distance from the probe beam origin to the focal point; $R_0=k\Delta R$.

Figure 2:
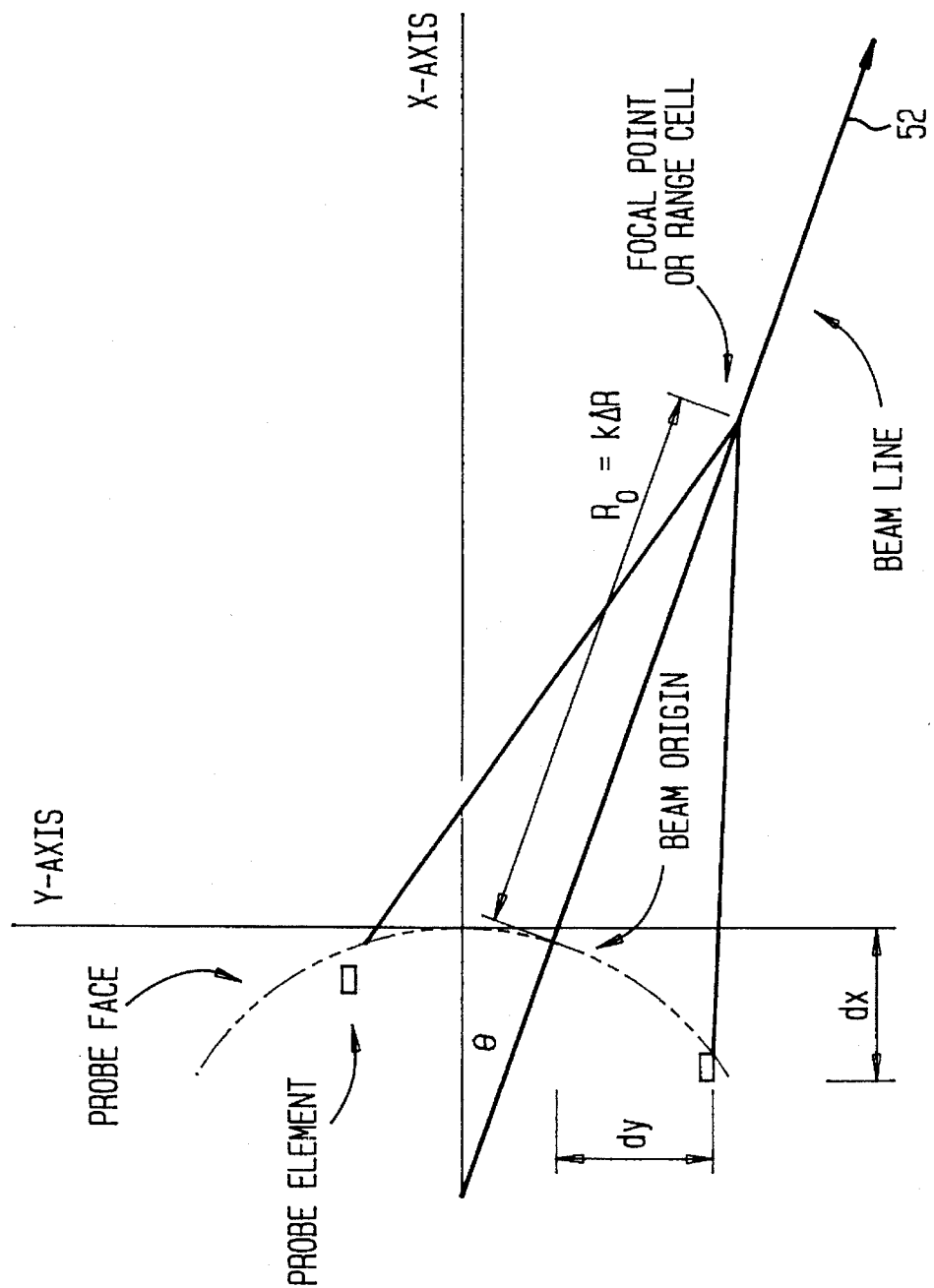
FIG. 2 is an x-y plot of a probe, an ultrasound beam, and a focal point (point of interest)

The relationship of these variables is illustrated in x-y plot of FIG. 2; the z-dimension is normal to the surface of the paper. The point of interest at any given time is referred to as the range cell or focal point 50. As an ultrasound examination progresses, this point can move axially along the line of the beam 52.

Figure 3:
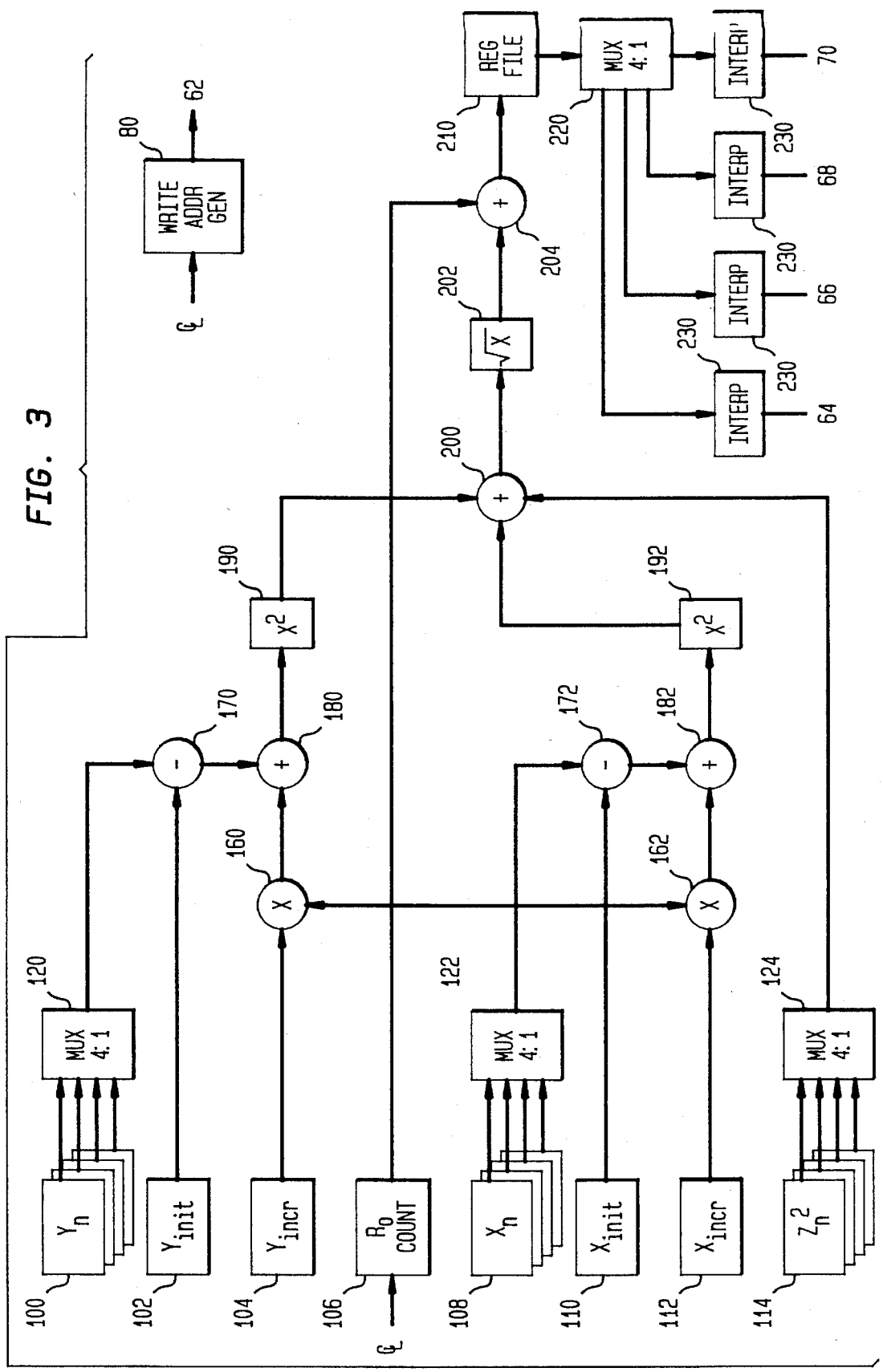
FIG. 3 is a schematic block diagram of a time-of-flight calculator.

The time-of-flight calculator 60 is shown in greater detail in FIG. 3. For the transmit phase, the calculator 60 has a write address generator 80 which can be a circulating 0–n counter that generates the addresses for locations in the RAMs 20. When it reaches the maximum address count, it overflows and cycles back to zero.

The calculator 60 has eight inputs: $Y_n$ 100, $Y_{init}$ 102, $Y_{incr}$ 104, range cell count $R_0$ 106, $X_n$ 108, $X_{init}$ 110, $X_{incr}$ 112, and $Z_n^2$ 114. $Y_n$ 100, $X_n$ 108, and $Z_n^2$ 114 represent locations in a memory of the values of the coordinates of the elements 12. $Y_{init}$ 102 and $X_{init}$ 110 are the coordinates of the beam origin and $Y_{incr}$ 104 and $X_{incr}$ 112 are the coordinates of the beam direction. For the purposes of calculating time-of-flight, the location ($X_{init}$, $Y_{init}$) is taken to be the point from which the ultrasound beam effectively originates, even though the beam may actually radiate from a number of elements on the surface of the probe, and not just a single point. The last five values ($Y_{init}$ 102, $Y_{incr}$ 104, range cell count $R_0$ 106, $X_{init}$ 110, and $X_{incr}$ 112) are provided during the operation of the apparatus. An internal clock triggers and drives both the write address generator 80 and the range cell counter $R_0$ 106. In practice, the start of the range cell counter 106 is delayed from the start of the write address generator 80.

In the example discussed here (FIG. 2), the value of $Z_n$ is zero, as only the x and y axes are employed. Similarly, while the calculator 60 of FIG. 3 can dynamically focus, i.e., provide time-of-flight values, in three dimensions, control over the direction of the beam or beam steering is limited to the x-y plane. However, if the transducer was a three-dimensional probe, then $Z_n$ could be a non-zero number. Then the beam can be focused in all three dimensions as the time-of-flight equation indicates. Further, with the addition of inputs for values of $Z_{init}$ and $Z_{incr}$, the calculator 60 could provide time-of-flight values for placing the beam origin at any point on the probe surface and steering the beam in three-dimensions.

Because the circuit shown in FIG. 1 has four channels 12, the schematic of FIG. 3 indicates four values each of $Y_n$ 100, $X_n$ 108, and $Z_n^2$ 114. Three multiplexers 120, 122, and 124 select the appropriate output of the memory. Two multiplication elements 160 and 162 calculate the products of $Y_{incr}$ 104 and $R_0$ (i.e., $k\Delta R\sin\Theta$), and $X_{incr}$ 112 and $R_0$ (i.e., $k\Delta R\cos\Theta$), respectively, and two subtraction elements 170 and 172 calculate the differences between $Y_n$ 100 and $Y_{init}$ 102 (i.e., dy), and $X_n$ 108 and $X_{init}$ 110 (i.e., dx), respectively. Summing elements 180 and 182 perform the respective operations of (dy+$k\Delta R\sin\Theta$) and (dx+$k\Delta R\cos\Theta$). These sums are then squared by squaring functions 190 and 192, and then the three squared terms, (dy+$k\Delta R\sin\Theta)^2$, (dx+$k\Delta R\cos\Theta)^2$, and $Z^2$ are summed by summing element 200. A square root function 202 takes the square root of the sum and the result is added to $R_0$ by summing element 204. The results are then temporarily stored in a register file 210.

The time-of-flight calculator 60 provides dynamic focusing of the beam as the focal point moves outward in the axial, or beam direction. By changing $R_0$, counting from 0 to its maximum count, the depth of the range cell 50 varies. In turn, the time-of-flight calculator 60 immediately calculates new addresses on the following clock cycle to accommodate the change in $R_0$.

In an effort to conserve memory and computation resources, the calculator 60 performs its calculations every m clock cycles and uses interpolation to provide intermediate time-of-flight values or addresses. To accomplish this, the results stored in the register file 210 are channeled through a multiplexer 220 and then interpolated by four delay interpolators 230 to produce the additional m−1 intermediate time-of-flight values. This process yields addresses for the respective data memories 20, enabling the retrieval of data from each memory corresponding to the same point of the object in space, the range cell 50, which has the coordinates ($k\Delta R\cos\Theta-X_{init}$, $k\Delta R\sin\Theta-Y_{init}$). After the memories 20 are read, the results are summed by the serial summation module 40. The outputs 44 of each of the serial summation modules 40 are similarly summed.

Figure 4:
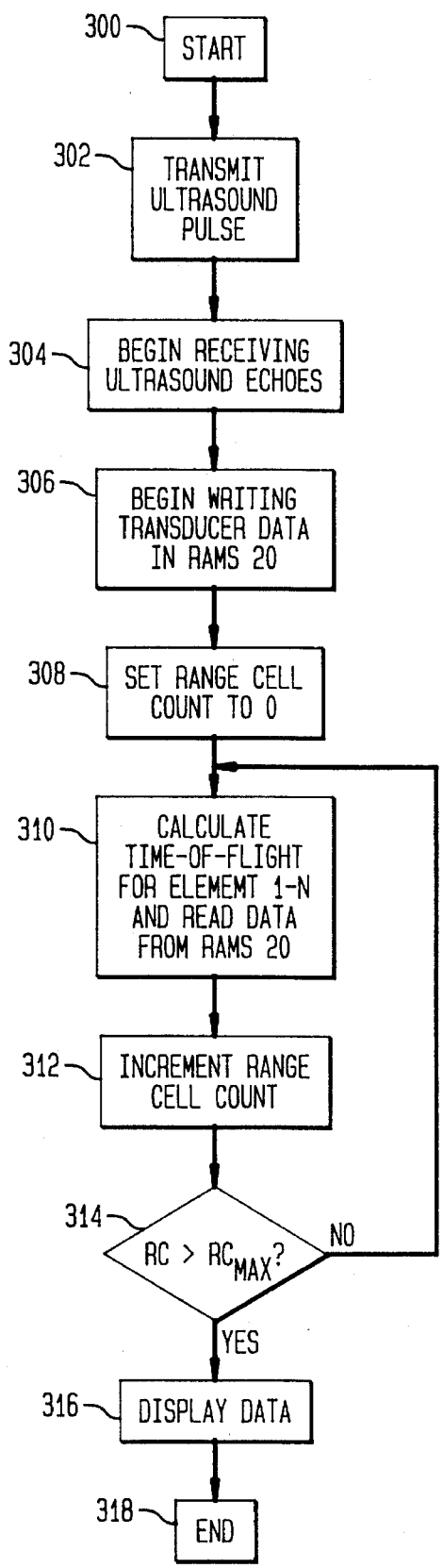
FIG. 4 is a flowchart of the operation of the time-of-flight calculator.

The overall operation of the calculator 60 in the beamformer is illustrated by the flowchart of FIG. 4. (The reference numbers in parentheses refer to the blocks in the flowchart.) At the start (300), the ultrasound transmitter (not shown) radiates a pulse (302). The transducer elements of the receive beamformer begin receiving ultrasound echoes (304). With the assistance of the write address generator 80, data from the transducers are written into the RAMs 20 (306). Next, the range cell counter 106 is set to the beginning value of zero (308). Then, the calculator 60 begins generating time-of-flight values for each channel 12 or transducer input 10 (310). As the values are generated, the data is read from the RAMs 20 (310). The range cell count is then incremented (312), and the calculation and data read step (310) is repeated, followed by incrementation, until the maximum range count is reached (314). Then the data is displayed (316), completing the sequence (318).

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An apparatus, comprising:

means for receiving, at a plurality of locations in a multi-dimensional space, energy effectively radiated from a first point in the multi-dimensional space and reflected from a second point in the multi-dimensional space, and generating an output for each of the plurality of locations;

storing means, responsive to the means for receiving and to a means for accessing, for storing the outputs and for retrieving the outputs; and means for accessing the storing means, the means for accessing including means for transmitting write addresses to the storing means, which write addresses are used to store the outputs;

first means for providing each of the plurality of locations in the multi-dimensional space;

second means for providing a location of the first point in the multi-dimensional space and a location of the second point in the multi-dimensional space; and means, responsive to the plurality of locations and the locations of the first and second points, in real time, after at least some of the write addresses have been transmitted, for calculating a time-of-flight from the second point to each of the plurality of locations and, responsive to the time-of-flights, for transmitting retrieval addresses to the storing means, which retrieval addresses are used to retrieve the outputs from the storing means.

2. An apparatus as set forth in claim 1, wherein the second means for providing includes means for providing a direction and a range of the second point relative to the first point.

3. An apparatus as set forth in claim 1, wherein the means for calculating includes means for interpolating between successive time-of-flight calculations.

4. An apparatus as set forth in claim 1, wherein the means for calculating includes means for calculating in three dimensions.

5. An apparatus as set forth in claim 1, which further includes means for dynamically varying the location of the second point.

6. An apparatus as set forth in claim 1, wherein the means for storing the locations is a random access memory.

7. An apparatus, comprising:

first means for providing each of a plurality of locations in a multi-dimensional space at which energy effectively radiated from a first point in the multi-dimensional space and reflected from a second point in the multi-dimensional space is received;

second means for providing a location of the first point in the multi-dimensional space and a location of the second point in the multi-dimensional space; and means, responsive to the locations of the first and second points and the plurality of locations, in real time, after the energy is received, for calculating a time-of-flight from the second point to each of the plurality of locations.

8. An apparatus as set forth in claim 7, wherein the second means for providing includes means for providing a direction and range of the second point relative to the first point.

9. An apparatus as set forth in claim 7, wherein the means for calculating includes means for interpolating between successive time-of-flight calculations.

10. An apparatus as set forth in claim 7, wherein the means for calculating further includes means for generating an address from the time-of-flight.

11. An apparatus as set forth in claim 7, wherein the means for calculating includes means for calculating in three dimensions.

12. An apparatus as set forth in claim 7, which further includes means for dynamically varying the location of the second point.

13. An apparatus as set forth in claim 7, wherein the means for storing the locations is a random access memory.

14. An apparatus, comprising:

an ultrasound probe for receiving, at a plurality of locations in a three-dimensional space, ultrasound energy effectively radiated from a first point in the three-dimensional space and reflected from a second point in the multi-dimensional space, and generating an output for each of the plurality of locations;

a memory, responsive to the means for receiving and to a means for accessing, for storing the outputs and for retrieving the outputs; and an address generator for the memory, the generator including:

means for transmitting write addresses to the memory, which write addresses are used to store the outputs;

a further memory for providing each of the plurality of locations in the multi-dimensional space;

register means for providing a location of the first point in the multi-dimensional space and a location of the second point in the multi-dimensional space; and means, responsive to the plurality of locations and the locations of the first and second points, in real time, after at least some of the write addresses have been transmitted, for calculating a time-of-flight from the second point to each of the plurality of locations, and responsive to the time-of-flights for transmitting retrieval addresses to the memory, which retrieval addresses are used to retrieve the outputs from the memory.

* * * * *